(12) United States Patent
Tenkasi Shankar et al.

(10) Patent No.: US 11,138,748 B2
(45) Date of Patent: Oct. 5, 2021

(54) METHOD AND APPARATUS FOR CLASSIFYING DEPTH SCANS

(71) Applicant: Zebra Technologies Corporation, Lincolnshire, IL (US)

(72) Inventors: Raghavendra Tenkasi Shankar, Holbrook, NY (US); David S. Koch, East Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 102 days.

(21) Appl. No.: 16/136,749

(22) Filed: Sep. 20, 2018

(65) Prior Publication Data

US 2020/0098121 A1    Mar. 26, 2020

(51) Int. Cl.
| | |
|---|---|
| *G06T 7/00* | (2017.01) |
| *G06T 7/50* | (2017.01) |
| *G01B 11/22* | (2006.01) |
| *G06T 7/11* | (2017.01) |

(52) U.S. Cl.
CPC ............. *G06T 7/50* (2017.01); *G01B 11/22* (2013.01); *G06T 7/11* (2017.01); *G06T 2207/10028* (2013.01)

(58) Field of Classification Search
CPC ... G06T 7/11; G06T 2207/10028; G06T 7/50; G01B 11/22
See application file for complete search history.

(56) References Cited

U.S. PATENT DOCUMENTS

| | | | |
|---|---|---|---|
| 2016/0033368 A1* | 2/2016 | Neau ................... | G01M 17/027 702/34 |
| 2016/0121671 A1* | 5/2016 | Neau ....................... | G06T 17/00 703/6 |
| 2018/0336729 A1* | 11/2018 | Prideaux-Ghee ....... | G06F 3/011 |
| 2020/0062042 A1* | 2/2020 | Pryce .................... | G01B 11/22 |

* cited by examiner

*Primary Examiner* — Ping Y Hsieh

(57) ABSTRACT

A method for classifying depth scan data at a computing device includes: obtaining, at the computing device, a set of depth measurements and a graphical representation of the depth measurements; automatically selecting, at the computing device, a subset of the depth measurements indicating a region of interest; rendering, on a display of the computing device, an image including (i) the graphical representation of the depth measurements and (ii) a graphical indication of the region of interest overlaid on the graphical representation of the depth measurements; receiving, via an input device, a selection associated with the image; and generating a region of interest indicator based on the subset of the depth measurements and the selection.

19 Claims, 7 Drawing Sheets

METHOD AND APPARATUS FOR CLASSIFYING DEPTH SCANS

BACKGROUND

Tire wear dictates the need for replacement of a tire, and is typically assessed by measuring the depth of tire treads. A worn tire exhibits shallower treads, and may require replacement. Tire tread depth is typically measured manually with a tread depth gauge, but such measurements may be prone to inaccuracies or measurement errors. Other tread depth mechanisms, such as imaging-based mechanisms, may suffer from incorrect detection of tire treads, leading to inaccurate assessments of tire wear.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
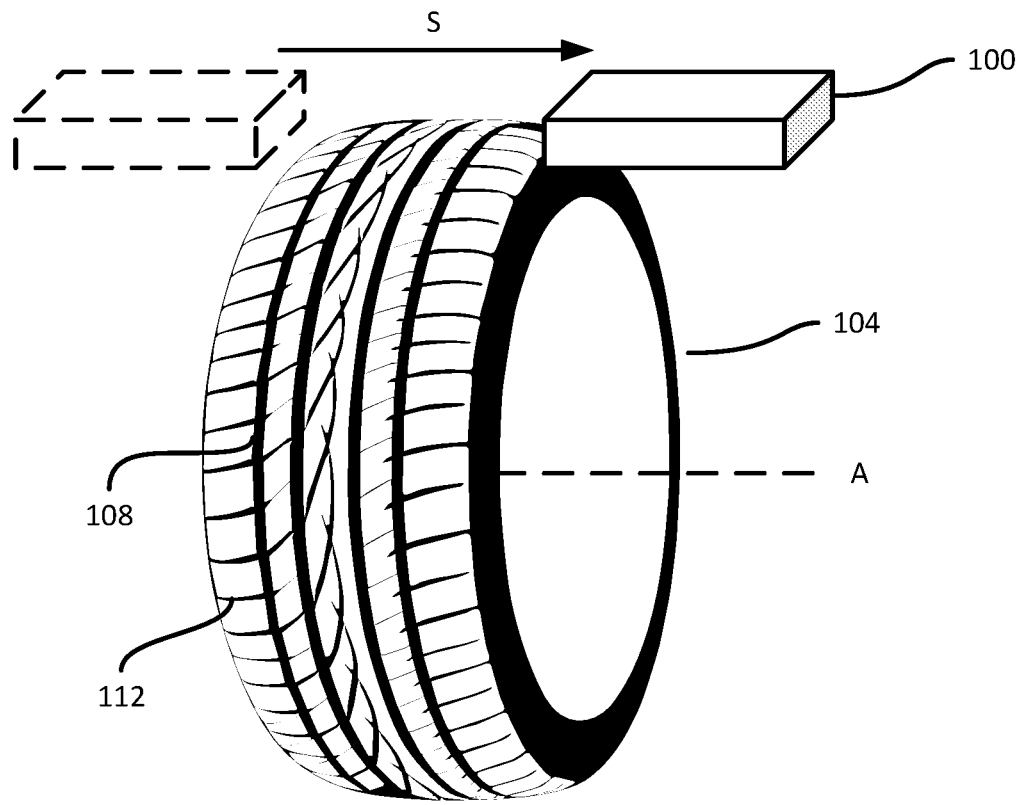
FIG. 1A illustrates a computing device for capturing depth scan data from a tire.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for classifying depth scan data at a computing device, comprising: obtaining, at the computing device, a set of depth measurements and a graphical representation of the depth measurements; automatically selecting, at the computing device, a subset of the depth measurements indicating a region of interest; rendering, on a display of the computing device, an image including (i) the graphical representation of the depth measurements and (ii) a graphical indication of the region of interest overlaid on the graphical representation of the depth measurements; receiving, via an input device, a selection associated with the image; and generating a region of interest indicator based on the subset of the depth measurements and the selection.

Additional examples disclosed herein are directed to a computing device, comprising: a display; an input device; a processor connected with the display and the input device, the processor configured to obtain a set of depth measurements and a graphical representation of the depth measurements; the processor further configured to automatically select a subset of the depth measurements indicating a region of interest; the processor further configured to control the display to render an image including (i) the graphical representation of the depth measurements and (ii) a graphical indication of the region of interest overlaid on the graphical representation of the depth measurements; the processor further configured to receive, via the input device, a selection associated with the image; and the processor further configured to generate a region of interest indicator based on the subset of the depth measurements and the selection.

Further examples disclosed herein are directed to a non-transitory computer-readable medium storing computer-readable instructions executable by a computing device, wherein execution computer-readable instructions configures the device to: obtain a set of depth measurements and a graphical representation of the depth measurements; automatically select a subset of the depth measurements indicating a region of interest; render, on a display of the computing device, an image including (i) the graphical representation of the depth measurements and (ii) a graphical indication of the region of interest overlaid on the graphical representation of the depth measurements; receive, via an input device, a selection associated with the image; and generate a region of interest indicator based on the subset of the depth measurements and the selection.

FIG. 1A depicts a computing device 100 configured to obtain and classify depth scan data obtained from an object, such as a tire 104. The tire 104 is shown in isolation but may be mounted on a vehicle, such as an automobile, delivery van, trailer, or the like. In particular, the depth scan data obtained and classified by the computing device 100 is a depth scan of a plurality of treads of the tire 104. The treads of the tire 104 may include major treads 108 and minor treads 112. The major treads 108 (of which the tire 104 as illustrated includes four) typically extend continuously around the circumference of the tire 104. Minor treads 112, as seen in FIG. 1A, may not extend continuously around the circumference of the tire 104. The minor treads 112 may also have smaller tread depths than the major treads 108.

In the present example, the computing device 100 is a mobile computing device, such as a mobile computer (e.g. a handheld computer) configured to obtain the depth scan data by traversing (e.g. via manipulation by an operator, not shown) the tire 104 or other object to be scanned in a direction "S". In the present example, in which the object to be scanned is the tire 104, the direction S of scanning is parallel to an axis A of the tire (i.e. perpendicular to the major treads 108).

Figure 1B:
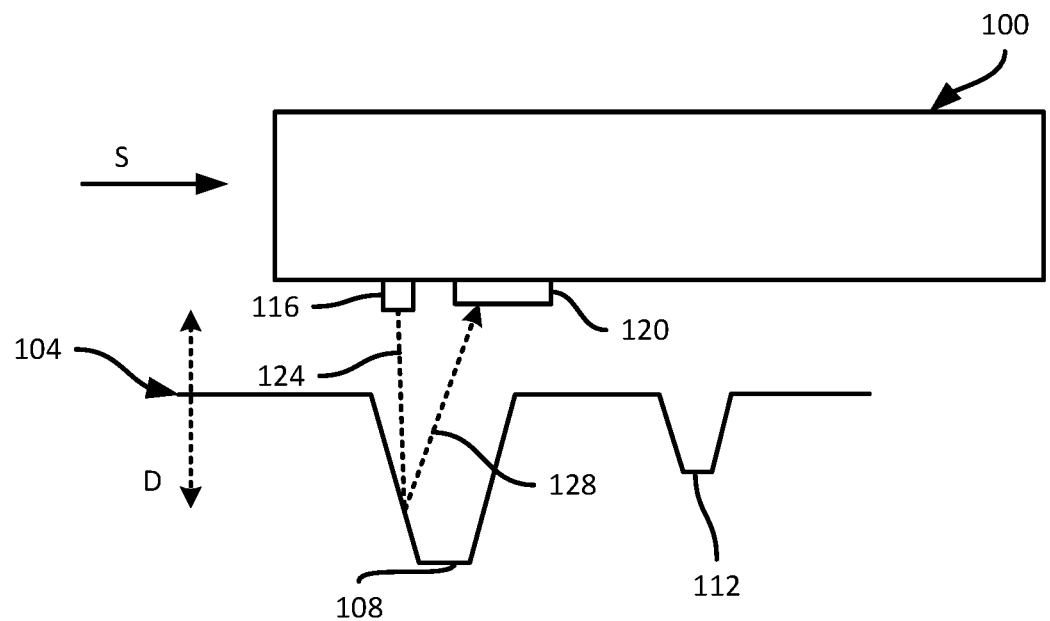
FIG. 1B is a schematic of the computing device of FIG. 1A during capture of the depth scan data.

As seen in FIG. 1B, the computing device 100 includes a depth scanning assembly including a light emitter 116 (e.g. a laser emitter) and an image sensor 120 and associated optics. The depth scanning assembly is configured to emit a beam 124 of light, a reflection 128 of which is captured by the image sensor 120. As the computing device 100 traverses the surface of the tire 104 along the scanning direction S, a plurality of reflections are therefore captured, each corresponding to a different point along the surface of the tire 104. The computing device 100 is further configured, based on the position of the reflection 128 as captured by the image sensor 120, and on the known position of the image sensor 120 relative to the emitter 116, to determine a depth D from the image sensor 120 to the point on the tire 104 at which the reflection 128 originated.

Various other mechanisms may also be employed to obtain depth scan data than the laser-based scanning mentioned above. For example, the computing device 100 can employ ultrasound, a movable pin or needle configured to travel across the surface of the tire 104, or the like, to obtain the depth scan data. In further embodiments, the depth scan data can be generated by a separate device (not shown) and communicated to the computing device 100 for classification. As will be discussed in greater detail below, having obtained the depth scan data, the computing device 100 is configured to classify the depth scan data to automatically identify one or more regions of interest (e.g. treads of the tire 104), and to generate one or more region of interest (ROI) indicators based on the automatic identification and on input data (e.g., received from an operator of the computing device) accepting and/or modifying the automatically identified regions of interest.

Before discussing the functionality of the computing device 100 in greater detail, certain components of the computing device 100 will be described with reference to FIG. 2.

Figure 2:
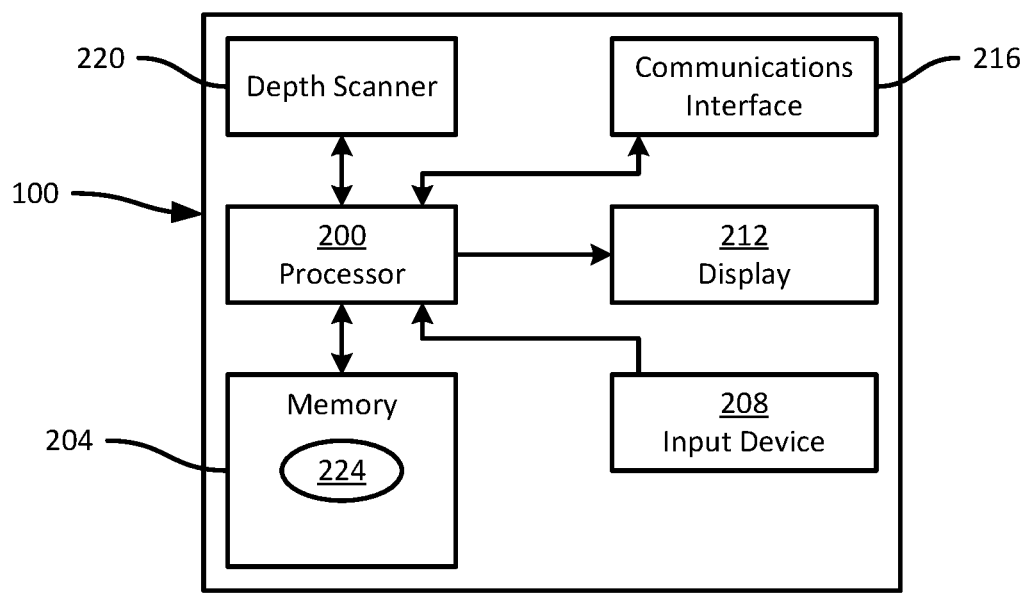
FIG. 2 is a block diagram of certain internal hardware components of the computing device of FIGS. 1A and 1B.

As shown in FIG. 2, the computing device 100 includes a central processing unit (CPU), also referred to as a processor 200, interconnected with a non-transitory computer readable storage medium, such as a memory 204. The memory 204 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 200 and the memory 204 each comprise one or more integrated circuits.

The computing device 100 also includes at least one input device 208 interconnected with the processor 200. The input device 208 is configured to receive input and provide data representative of the received input to the processor 200. The input device 208 includes any one of, or a suitable combination of, a touch screen, a keypad, a trigger button, a microphone, and the like. The computing device 100 also includes a display 212 (e.g. a flat-panel display integrated with the above-mentioned touch screen) interconnected with the processor 200, and configured to render data under the control of the processor 200. The computing device 100 can also include one or more output devices in addition to the display 212, such as a speaker, a notification LED, and the like (not shown).

The computing device 100 also includes a communications interface 216 interconnected with the processor 200. The communications interface 216 includes any suitable hardware (e.g. transmitters, receivers, network interface controllers and the like) allowing the computing device 100 to communicate with other computing devices via wired and/or wireless links (e.g. over local or wide-area networks). The specific components of the communications interface 216 are selected based on the type(s) of network(s) or other links that the computing device 100 is required to communicate over.

The computing device 100 also includes a depth scanning assembly 220 interconnected with the processor 200. The depth scanning assembly 220, in the present example, includes the above-mentioned emitter 116 and image sensor 120. In other examples, the depth scanning assembly 220 can include additional emitters and/or images sensors, or other depth-sensing components instead of the emitter 116 and image sensor 120. In still further embodiments, the depth scanning assembly 220 is omitted, and depth scan data is collected by a distinct device (not shown) and supplied to the computing device 100 for further processing, including the classification discussed below.

The memory 204 of the computing device 100 stores a plurality of applications, each including a plurality of computer readable instructions executable by the processor 200. The execution of the above-mentioned instructions by the processor 200 causes the computing device 100 to implement certain functionality, as discussed herein. The applications are therefore said to be configured to perform that functionality in the discussion below. In the present example, the memory 204 of the computing device 100 stores a depth scan classification application 224, also referred to herein as the application 224. The computing device 100 is configured, via execution of the application 224 by the processor 200, to obtain depth scan data, such as a depth scan of the tire 104. The computing device 100 is further configured to automatically identify one or more regions of interest in the depth scan (e.g. the major treads 108), and to render the depth scan and automatically identified regions of interest on the display 212. The computing device 100 is further configured to receive input data (via the input device 208) that may alter one or more of the automatically identified regions of interest, before generating final region of interest indicators for output.

In other examples, the processor 200, as configured by the execution of the application 224, is implemented as one or more specifically-configured hardware elements, such as field-programmable gate arrays (FPGAs) and/or application-specific integrated circuits (ASICs).

Figure 3:
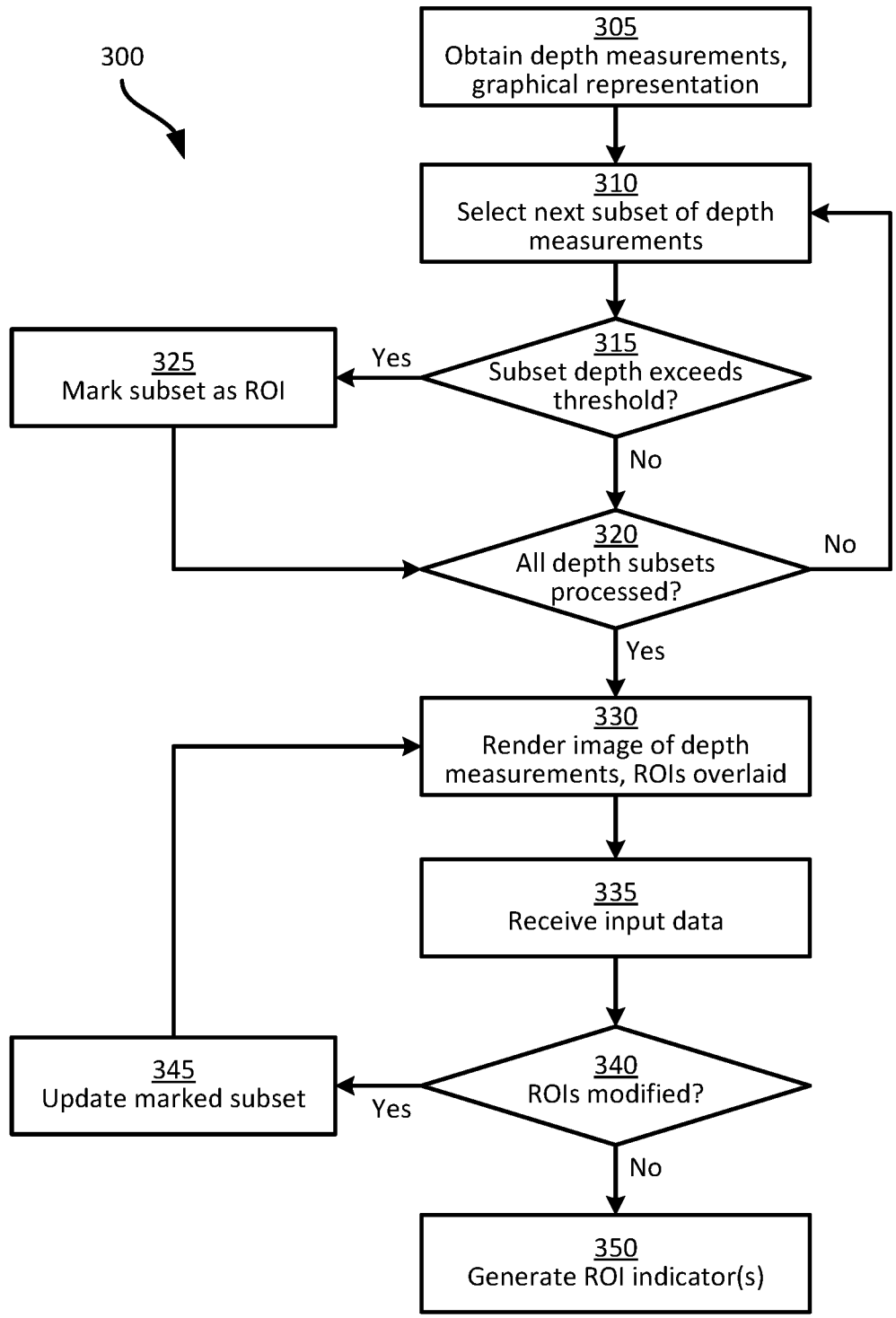
FIG. 3 is a flowchart of a method of classifying depth scan data.

The functionality implemented by the computing device 100 via execution of the application 224 will now be described in greater detail, with reference to FIG. 3. FIG. 3 illustrates a method 300 of classifying depth scan data. The method 300 will be described in conjunction with its performance by the computing device 100, in particular via the execution of the application 224.

At block 305, the computing device 100 is configured to obtain depth scan data, including a plurality of depth measurements and a graphical representation of the depth measurements. The depth measurements obtained at block 305, in the present example, are generated at the computing device from the reflections detected by the image sensor 120, e.g. by triangulation. In other embodiments, the depth measurements can be received from a distinct device, loaded from the memory 204 (e.g. having been previously generated or received from another device) or the like. The depth measurements include a sequence of depth values, corresponding to respective points in a sequence along the surface of the object (e.g. the tire 104).

The graphical representation of the depth measurements can be obtained by generation at the computing device 100, or by receipt from another device at the computing device 100. The graphical representation can be generated (at the computing device 100 itself or at another computing device) from the depth measurements. In the present example, however, the graphical representation of the depth measurements is the image data captured by the image sensor 120 during the scan of the object. That is, the graphical representation is a trace of the reflections 128 of the emitted beam 124 as the computing device 100 is drawn across the surface of the tire 104 in the scan direction S. The depth measurements are then derived from the image data.

Figure 4A:
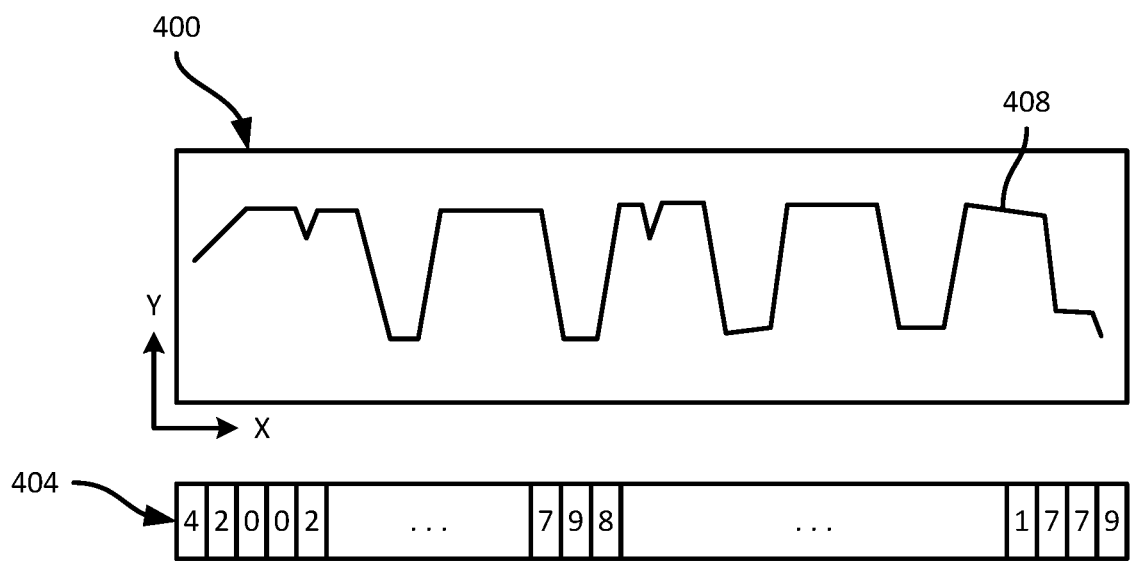
FIGS. 4A-4B are graphical representations of depth scan data.

Referring to FIG. 4A, a graphical representation 400 of a set of depth measurements 404 (only a portion of the depth measurements are shown for clarity of illustration) are shown, depicting a tread profile of the tire 104. As noted above, the graphical representation 400 is the image data captured by the image sensor 120, and the depth measurements 404 are measurements (e.g. in increments of $\frac{1}{32}$ of an inch) derived from the image data, according to the known relative positions of the emitter 116 and the image sensor 120. Depth measurements indicate the distance of the surface of the tire from the device 100, and thus the measurements 7, 9 and 8 near the center of the set of depth measurements 404 indicate the presence of a tread (e.g. a major tread 108), illustrated as a valley in the graphical representation 400. The measurements 4, 2, 0 at the left edge of the set of depth measurements 404, on the other hand, indicate the presence of the rounded corner of the tire 104 (e.g. the measurements of 4 and 2), followed by the surface of the tire 104 that contacts the ground when the tire 104 rolls (e.g. the measurement of 0).

As seen in FIG. 4A, the graphical representation 400 includes a sequence 408 of pixels depicting the tread profile. The position of each pixel is defined according to a first axis (e.g. the X axis as illustrated) and a second axis (e.g. the Y axis as illustrated). The position of a pixel along the first axis indicates the order of the pixel in the sequence, and therefore indicates which point along the surface of the object the pixel corresponds to. The position of a pixel on the second axis indicates the depth represented by the pixel.

Other graphical representations are also contemplated, such as a straight line of pixels in which each pixel has a color or grayscale value indicating a depth (e.g. white pixels for the lowest depth, and dark pixels for the greatest depth, indicating the deepest treads on the tire 104).

Returning to FIG. 3, at block 310, the computing device 100 is configured to select a subset of the depth measurements for further processing. The subset can be a single measurement, a group of adjacent measurements of a fixed size (e.g. a group of ten adjacent measurements), or a group of adjacent measurements having similar depths. For example, the computing device 100 can be configured to select as a subset all adjacent measurements corresponding to depth measurements that differ by less than $\frac{1}{32}$ inch.

At block 315, the computing device 100 is configured to determine whether a subset depth corresponding to the subset selected at block 310 exceeds a threshold. The threshold can be preconfigured, and is selected to correspond to the likely presence of a tread on the tire 104 (or other feature of interest, for objects other than the tire 104). For example, in the case of the tire 104, the threshold employed at block 315 may be $\frac{3}{32}$ inches. Thus, if the depth of the subset (e.g. an average of the depths in the subset) is smaller than $\frac{3}{32}$ inches, the determination at block 315 is negative, and the performance of the method 300 proceeds to block 320.

The threshold applied at block 315 can also include a threshold number of measurements that must be exceeded for an affirmative determination to be made. For example, a subset of measurements having an average depth exceeding the threshold, but containing fewer measurements than the population threshold (e.g. ten measurements) may still result in a negative determination at block 315. In other examples, the threshold applied at block 315 can include a shape criterion, for example defining a gradient between the current subset and adjacent subsets (i.e. indicating how sharply the measured depth changes between subsets). The above examples of thresholds may be employed individually or in any suitable combination. In further examples, the threshold at block 315 can be applied to a confidence level derived from one or more of the above (e.g. whether the depth of the subset exceeds a threshold relative to adjacent depth measurements, what surface shape the subset defines, and the like). The threshold at block 315, in such examples, is a confidence level above which the determination is affirmative (e.g. about 70%, although confidence thresholds both above and below 70% may also be employed).

When the determination at block 315 is negative, at block 320 the computing device 100 is configured to determine whether the entire set of depth measurements has been processed. When the determination at block 320 is negative, the computing device 100 returns to block 310 to select the next subset of depth measurements in the sequence.

When the determination at block 315 is affirmative, however, the performance of method 300 proceeds to block 325. At block 325, the subset selected at block 310 is marked as a region of interest (e.g. a major tire tread 108). Marking the subset may be accomplished, for example, by adding a flag to each depth measurement in the subset. In other embodiments, a repository (not shown) can be maintained in the memory 204 indicating the positions of depth measurements that have been marked as indicating regions of interest.

Figure 4B:
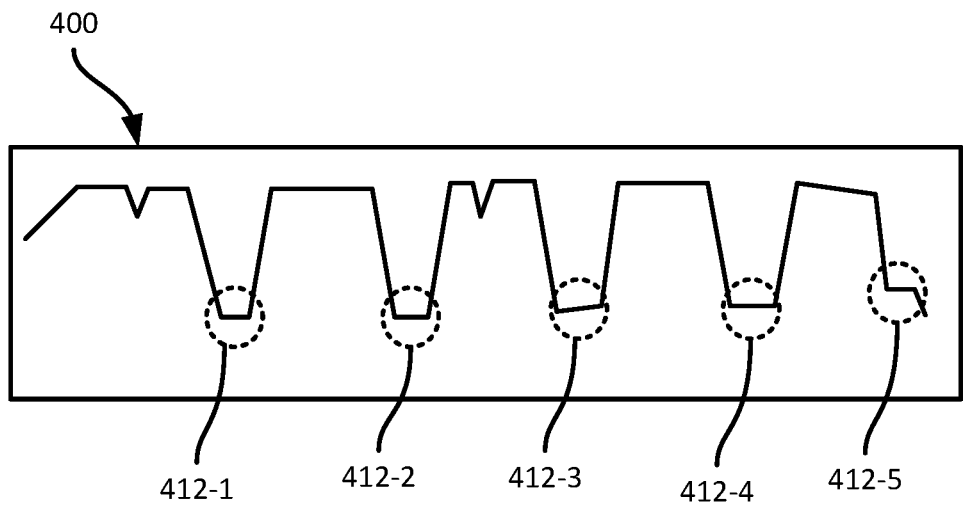

When the entire set of depth measurements has been traversed via blocks 310-325, the set of depth measurements has therefore been classified as corresponding to regions of interest (e.g. major tire treads 108) or as not corresponding to regions of interest (e.g. minor tire treads 112 or tire surface between treads). Turning to FIG. 4B, the graphical representation 400 is shown overlaid with indications 412 of regions of interest. That is, the indications 412 (specifically, five indications 412-1, 412-2, 412-3, 412-4 and 412-5) indicate portions of the image data corresponding to depth measurements classified as tire treads, in the present example. Comparing the image shown in FIG. 4B to the tire 104 shown in FIG. 1A, it will be apparent that the indications 412-1 to 412-4 correspond to the four major treads 108. The indication 412-5, in contrast, corresponds to a minor tread 112 at an edge of the tire 104. The location of the minor tread 112 at or near the tire edge may cause the depth measurements corresponding to the minor tread 112 to be inflated (i.e. depicting the tread 112 as being deeper than in actuality).

Figure 5A:
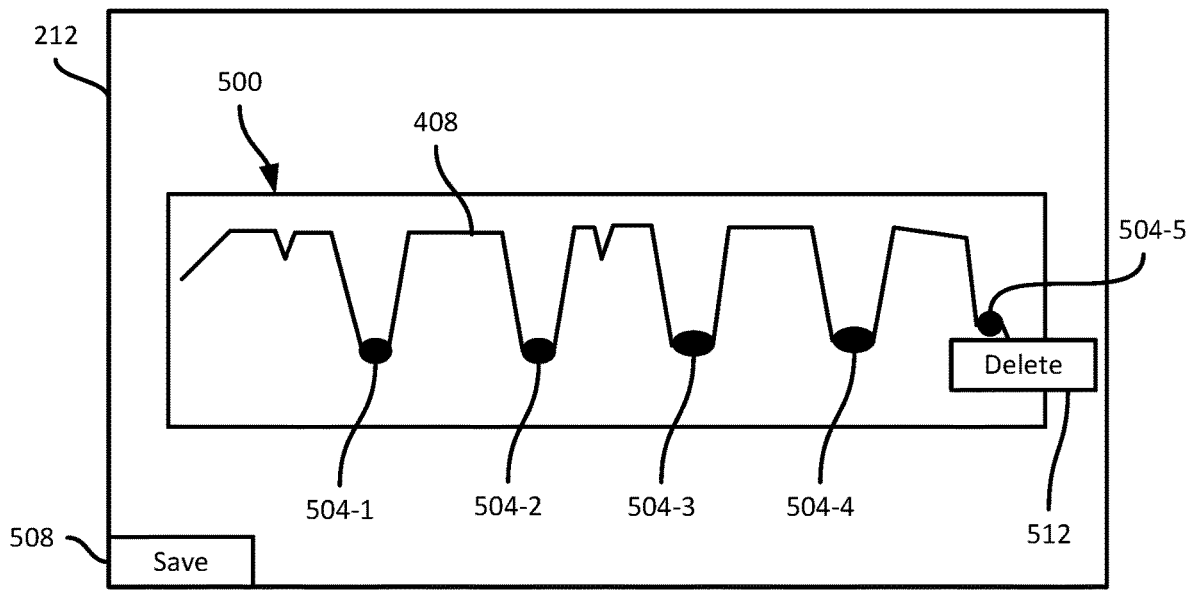
FIGS. 5A and 5B show images rendered by the computing device in the performance of the method of FIG. 3.

Returning to FIG. 3, at block 330 the computing device 100 is configured to render an image on the display 212 including the graphical representation of the depth measurements, and graphical indications of the regions of interest identified through blocks 315-325 overlaid on the graphical representation of the depth measurements. Turning to FIG. 5A, an example image 500 is shown, as presented on the display 212. In other embodiments, the image 500 may also be generated and transmitted to another device for display.

The image 500 includes the sequence 408 of pixels mentioned earlier, as well as a set of graphical indications 504-1, 504-2, 504-3, 504-4 and 504-5 of the regions of interest 412 illustrated in FIG. 4B. The graphical indications 504 are shown as dark ovals sized according to the size of the corresponding region of interest in the illustrated example, but it will be understood that a wide variety of other forms of graphical representation may be employed for the graphical indications 504. For example, the computing device 100 can be configured to generate each graphical indication 504 by altering the color, thickness or the like of the subset of pixels in the sequence 408 that correspond to the region of interest.

Referring again to FIG. 3, responsive to rendering the image 500 on the display 212, the computing device 100 is configured to receive input data at block 335. The input data received at block 335 is received at the processor 200 via the input device 208, such as a touch screen integrated with the display 212. The input data received at block 335 represents either an approval of the regions of interest as currently presented on the display 212, or a modification to the regions of interest. Returning to FIG. 5A, the display 212 is controlled to render, in addition to the image 500, a selectable element 508 (a selectable "save" button, in the illustrated example) for approving the currently displayed regions of interest.

FIG. 5A also illustrates a selectable element 512 for modifying the regions of interest. For example, the element 512 can be rendered on the display responsive to input data selecting one of the graphical indications 504. The element 512, in the illustrated example, is labelled as a "delete" button, the selection of which modifies the graphical indication 504-5 by deleting the graphical indication 504-5. In other examples, other selectable elements can be presented in addition to, or instead of, the element 512. For example, a "modify" element can be presented, the selection of which causes the computing device 100 to render a prompt on the display 212 to select a new location on the sequence 408, size, or the like, for the graphical indication 504.

Returning to FIG. 3, at block 340 the computing device 100 is configured to determine whether the input data received at block 335 indicates approval or modification of the regions of interest currently rendered on the display 212. When the determination at block 340 is affirmative (e.g. following a selection of the graphical indication 504-5 and a selection of the delete element 512), performance of the method 300 proceeds to block 345, at which the computing device 100 is configured to update the subsets of depth measurements marked as corresponding to regions of interest. In particular, in the present example, the subset of depth measurements corresponding to the graphical indication 504-5 are un-marked, indicating that they do not correspond to a region of interest (e.g. a tire tread). Following the update at block 345, the computing device 100 repeats block 330 to update the rendered image according to the updates.

Figure 5B:
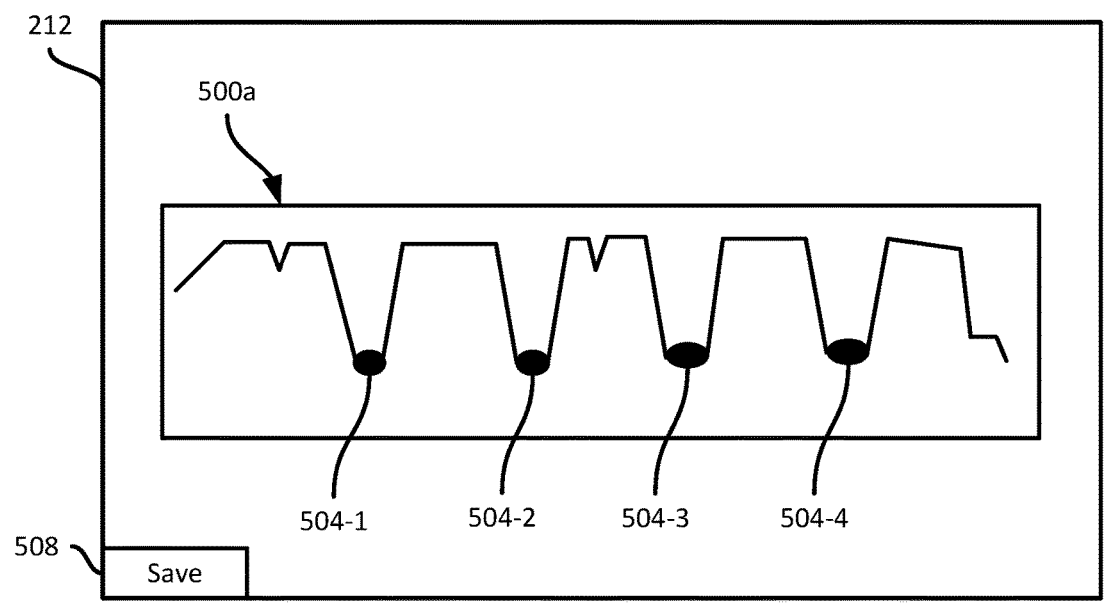

Referring to FIG. 5B, an image 500a is shown as rendered on the display 212 following receipt of the selection of the delete element 512 mentioned above. In particular, the graphical indication 504-5 no longer appears in the image 500a, indicating that the depth measurements corresponding to the graphical indication 504-5 are no longer marked as a region of interest.

Figure 6A:
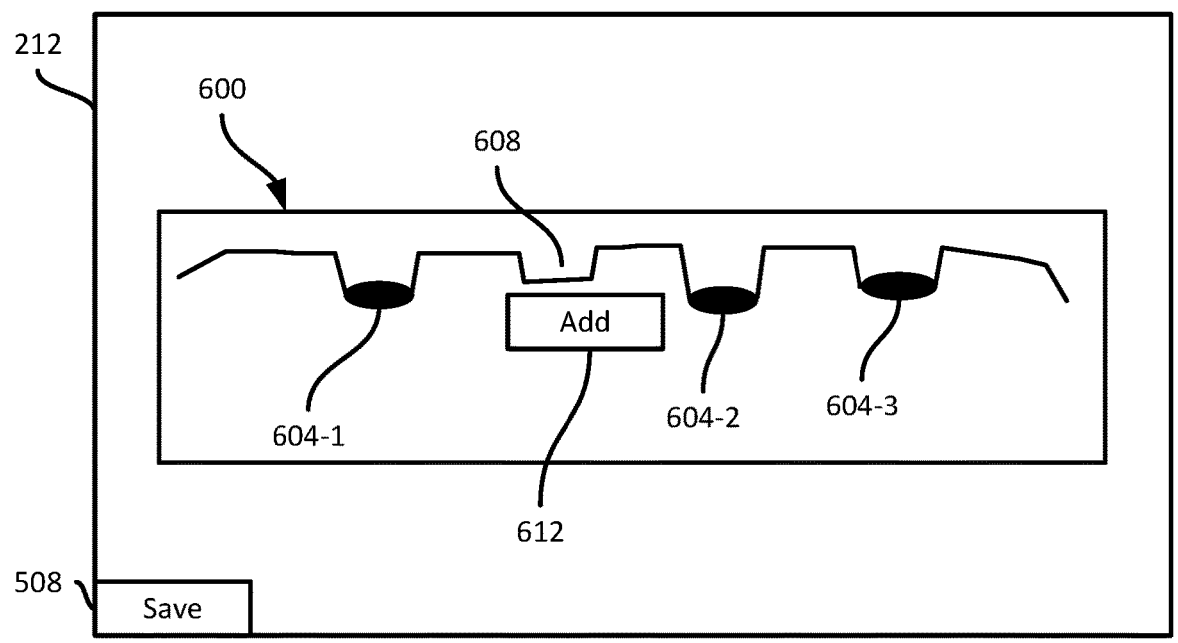
FIGS. 6A and 6B show images rendered by the computing device in another example performance of the method of FIG. 3.
Figure 6B:
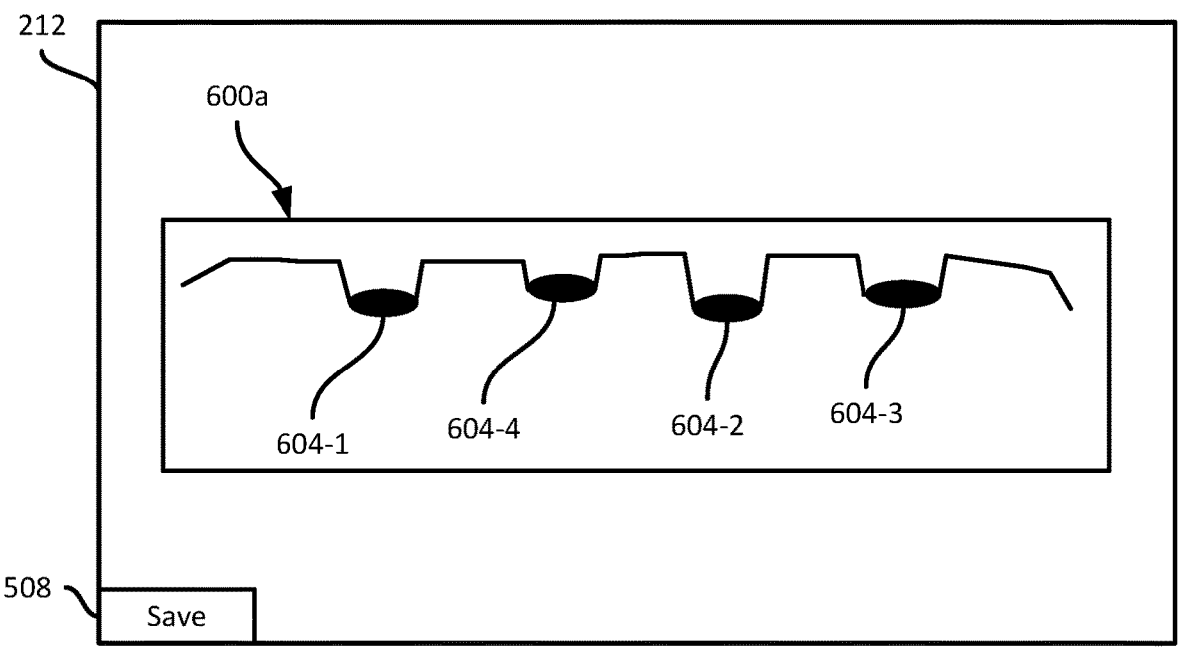

Turning to FIGS. 6A and 6B, another example performance of blocks 330 to 345 is illustrated. FIG. 6A depicts an image 600 containing a graphical representation of depth measurements of a worn tire (e.g. the tire 104 following a period of use), along with graphical indications 604-1, 604-2 and 604-3 of regions of interest identified via blocks 310-320. Of particular note, an area 608 of the image 600 does not include an overlaid graphical indication 604, because the depth measurements corresponding to the area 608 do not exceed the threshold applied at block 315. The area 608 may nevertheless correspond to a major tread of the tire, however. At block 335, the computing device 100 is configured to receive input data, such as a selection (e.g. via a touch screen) of the area 608. The computing device 100 can be configured, responsive to a selection of an area of the image rendered at block 330 that does not contain a graphical representation of a region of interest, to render a selectable "add" element 612. Receipt of a selection of the element 612 at block 335 causes the computing device 100 to mark the corresponding depth measurements as a region of interest (despite the fact that the corresponding depth measurements did not satisfy the threshold at block 315).

At a subsequent performance of block 330, the image 600 is replaced with an image 600, shown in FIG. 6B, in which a graphical indication of a region of interest 604-4 is shown, indicating that the corresponding subset of depth measurements has been marked as a region of interest. In other words, a tire tread that was not identified in the automatic process of blocks 310-320 (e.g. because the tire is sufficiently worn that the depth of the undetected tread fell below the threshold of block 315) has been marked as a region of interest through the processing of input data at blocks 320-345.

Selection of the save element 508 in FIG. 5B or 6B leads to a negative determination at block 340. The performance of the method 300 therefore proceeds to block 350, at which the computing device 100 is configured to generate one or more region of interest indicators for output. Specifically, the computing device 100 is configured to generate a region of interest indicator for each subset of depth measurements marked as a region of interest following a negative determination at block 340. Each region of interest indicator includes at least a depth value corresponding to the region of interest. The depth value can be, for example, the maximum depth associated with the region of interest (i.e. the greatest depth in the subset of depth measurements corresponding to the region of interest), an average depth associated with the region of interest, or the like. Each region of interest indicator can also include an identifier, such as a sequence number indicating the order of the ROI indicator relative to other ROI indicators (e.g. along the scan direction S).

The computing device 100 is configured at block 350 to output the region of interest indicators. The output can take a variety of forms. For example, the output can include a set of ROI indicators for printing on a physical receipt, label or the like, either by the computing device 100 itself or a printer (not shown) connected to the computing device 100 via the communications interface 216. In a further example, the output can include storing the ROI indicators in the memory 204 for transmission to a server (not shown) or any other suitable computing device.

Figure 7A:
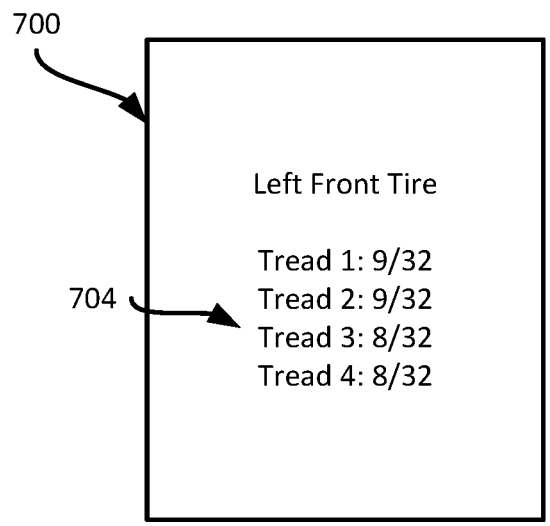
FIGS. 7A and 7B show output generated by the computing device via performance of the method of FIG. 3.
Figure 7B:
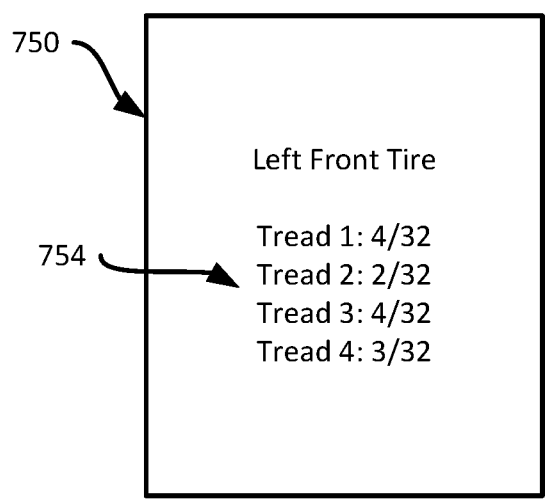

FIGS. 7A and 7B illustrate example ROI indicators generated at block 350, printed on receipts 700 and 750. The receipt 700 includes a set of four ROI indicators 704 indicating the depths of regions of interest shown in FIG. 5B, while the receipt 750 includes a set of four ROI indicators 754 indicating the depths of regions of interest shown in FIG. 6B.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for classifying depth scan data at a computing device, comprising:
   obtaining, at the computing device, a set of depth measurements and a graphical representation of the depth measurements;
   automatically selecting, at the computing device, a subset of the depth measurements indicating a region of interest;
   rendering, on a display of the computing device, an image including (i) the graphical representation of the depth measurements and (ii) a graphical indication of the region of interest overlaid on the graphical representation of the depth measurements;
   receiving, via an input device, a selection associated with the image; and
   generating a region of interest indicator based on the subset of the depth measurements and the selection.

2. The method of claim 1, wherein the graphical representation of the depth measurements depicts a side profile of a surface of a tire.

3. The method of claim 1, wherein the set of depth measurements correspond to respective points across a surface of a tire.

4. The method of claim 3, wherein the region of interest is a tread of the tire.

5. The method of claim 1, wherein automatically selecting the subset of the depth measurements comprises determining whether the subset of the depth measurements exceeds a depth threshold.

6. The method of claim 1, wherein automatically selecting the subset of the depth measurements comprises determining whether the subset of the depth measurements exceeds a population threshold.

7. The method of claim 1, wherein generating the region of interest indicator includes generating, at the computing device, a region of interest depth from the subset of depth measurements.

8. The method of claim 1, wherein receiving the selection includes receiving a selection of a location on the image.

9. The method of claim 8, further comprising:
   selecting a further subset of the depth measurements corresponding to the location as indicating a further region of interest; and
   rendering an updated image including (i) the graphical representation of the depth measurements and (ii) graphical indications of the region of interest and the further region of interest overlaid on the graphical representation of the depth measurements.

10. A computing device, comprising:

a display;

an input device;

a depth scanner configured to generate a set of depth measurements of an item; and a processor connected with the display, the depth scanner, and the input device, the processor configured to:

obtain the set of depth measurements and a graphical representation of the depth measurements;

automatically select a subset of the depth measurements indicating a region of interest;

control the display to render an image including (i) the graphical representation of the depth measurements and (ii) a graphical indication of the region of interest overlaid on the graphical representation of the depth measurements;

receive, via the input device, a selection associated with the image; and generate a region of interest indicator based on the subset of the depth measurements and the selection.

11. The computing device of claim 10, wherein the graphical representation of the depth measurements depicts a side profile of a surface of a tire.

12. The computing device of claim 10, wherein the set of depth measurements correspond to respective points across a surface of a tire.

13. The computing device of claim 12, wherein the region of interest is a tread of the tire.

14. The computing device of claim 10, wherein the processor is further configured to automatically select the subset of the depth measurements by determining whether the subset of the depth measurements exceeds a depth threshold.

15. The computing device of claim 10, wherein the processor is further configured to automatically select the subset of the depth measurements by determining whether the subset of the depth measurements exceeds a population threshold.

16. The computing device of claim 10, wherein the processor is further configured to generate the region of interest indicator by generating a region of interest depth from the subset of depth measurements.

17. The computing device of claim 10, wherein the selection associated with the image is a selection of a location on the image received via the input device.

18. The computing device of claim 17, wherein the processor is further configured to:

select a further subset of the depth measurements corresponding to the location as indicating a further region of interest; and control the display to render an updated image including (i) the graphical representation of the depth measurements and (ii) graphical indications of the region of interest and the further region of interest overlaid on the graphical representation of the depth measurements.

19. A non-transitory computer-readable medium storing computer-readable instructions executable by a computing device, wherein execution computer-readable instructions configures the device to:

obtain a set of depth measurements and a graphical representation of the depth measurements;

automatically select a subset of the depth measurements indicating a region of interest;

render, on a display of the computing device, an image including (i) the graphical representation of the depth measurements and (ii) a graphical indication of the region of interest overlaid on the graphical representation of the depth measurements;

receive, via an input device, a selection associated with the image; and generate a region of interest indicator based on the subset of the depth measurements and the selection.

* * * * *